No. 822,236. PATENTED JUNE 5, 1906.
A. A. BALL, Jr.
VEHICLE BRAKE.
APPLICATION FILED AUG. 10, 1903.
2 SHEETS—SHEET 1.
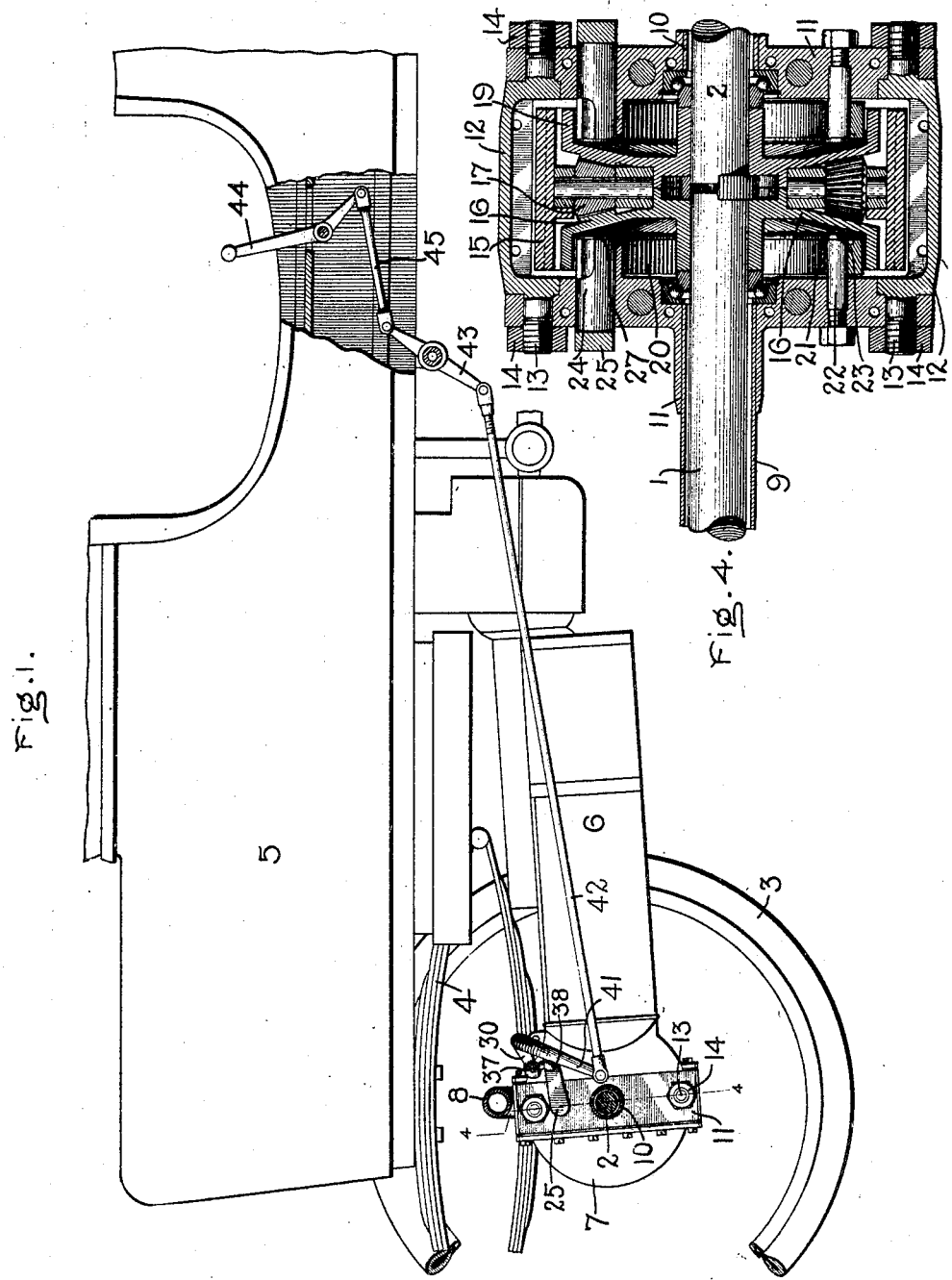
Witnesses:
Inventor,
Augustus A. Ball Jr.
By
Att'y.

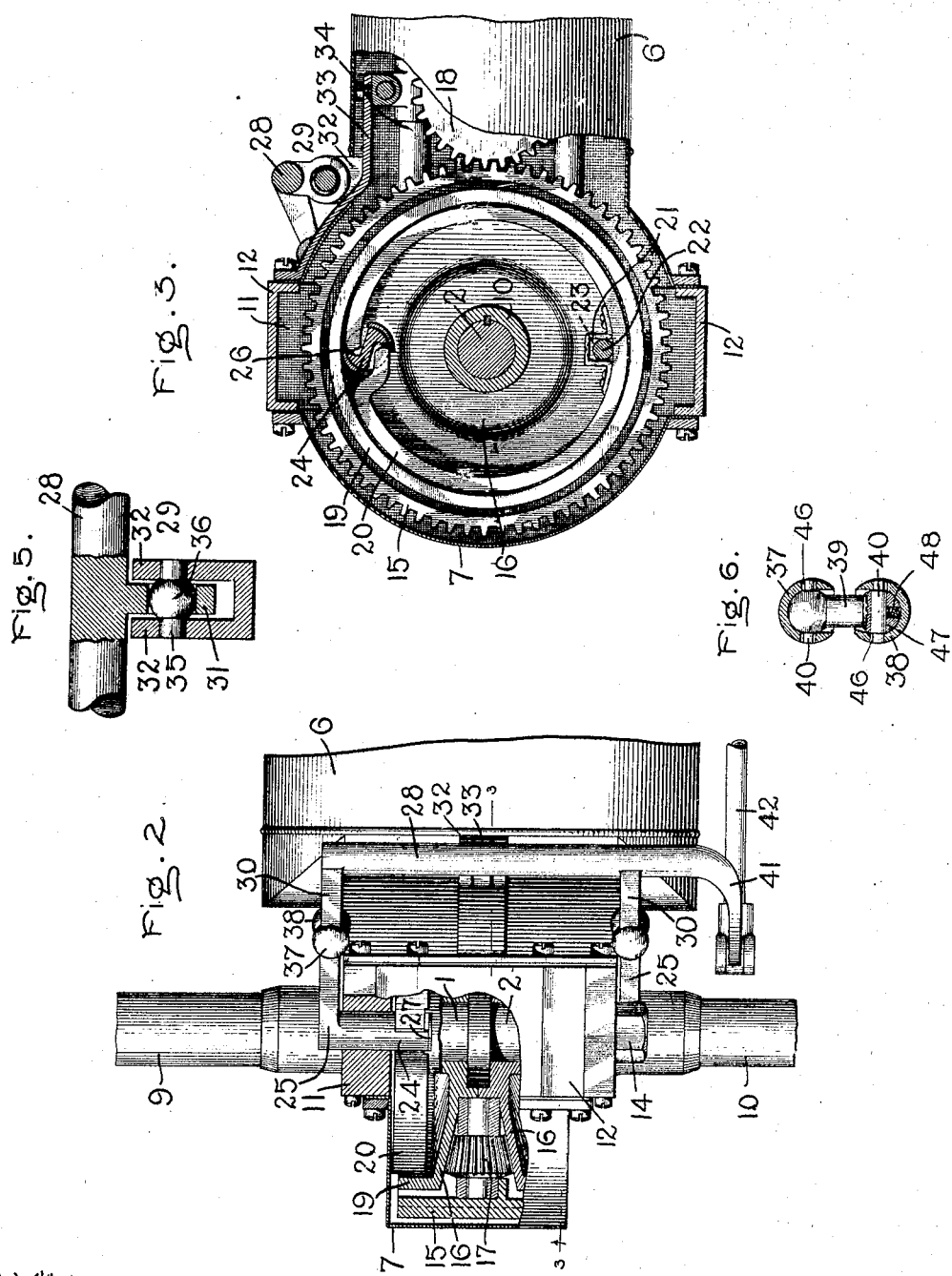

UNITED STATES PATENT OFFICE.

AUGUSTUS A. BALL, JR., OF LYNN, MASSACHUSETTS, ASSIGNOR, BY MESNE ASSIGNMENTS, TO GENERAL ELECTRIC COMPANY, A CORPORATION OF NEW YORK.

VEHICLE-BRAKE.

No. 822,236.        Specification of Letters Patent.        Patented June 5, 1906.

Application filed August 10, 1903. Serial No. 168,923.

*To all whom it may concern:*

Be it known that I, AUGUSTUS A. BALL, Jr., a citizen of the United States, residing at Lynn, in the county of Essex and State of Massachusetts, have invented certain new and useful Improvements in Vehicle-Brakes, of which the following is a specification.

This invention relates to vehicle-brakes, and is intended more particularly for self-propelled vehicles. Its object is to provide an improved constructon of brake adapted for use in connection with the differential gear of the driving mechanism and in such coöperative relation thereto as to be inclosed within the casing of the differential gear.

The details of construction and arrangement of parts will be more fully described hereinafter and finally pointed out in the claims.

In the accompanying drawings, Figure 1 is a fragmentary side elevation of an automobile with portions in section, showing one form of my improved brake device applied thereto. Fig. 2 is a sectional plan view of the differential gear, showing the brake mechanism more in detail and drawn on a larger scale. Fig. 3 is a vertical section on line 3 3 of Fig. 2. Fig. 4 is a vertical transverse section of the differential gear and brake on line 4 4 of Fig. 1 drawn on a larger scale, and Figs. 5 and 6 are enlarged views of detail parts.

Similar reference-numerals designate corresponding parts.

Referring to the drawings, 1 and 2 are the two parts of the center-divided rear axle; 3, one of the rear wheels; 4, the adjacent rear full-elliptic body-supporting spring, and 5 the vehicle-body.

While my invention is illustrated in connection with a steam-automobile, it is nevertheless applicable to other power plants in which differential gears are used in the power-transmission systems. The steam-engine is inclosed in a casing 6, which combines with the differential-gear casing 7 to form a complete housing for the power-transmission elements. A rear-axle arch 8 is arranged in the usual manner and connects with sleeves 9 and 10 of the divided axle. The detail of this construction is well known and is not here illustrated. The inner ends of the divided rear-axle sleeves 9 10, Fig. 4, are rigidly secured in the side plates 11 of the differential-gear yoke. These side plates are connected by top and bottom plates 12, which are provided with integral threaded studs 13, the latter passing through openings in the side plates, and nuts 14, engaging the studs rigidly, bolt the plates together. The plates 11 and 12 constitute the differential-gear yoke and also form part of the differential-gear casing.

The differential gear consists of a driven spur-gear 15, bevel gear-wheels 16 on the meeting ends of the divided axle, and bevel-pinions 17, carried by the spur-gear 15. The detail construction of the differential gear is included in the subject-matter of my copending application, Serial No. 177,047, filed October 14, 1903. The spur-gear 15 meshes with a driving-gear 18, Fig. 3, mounted on the crank-shaft of the engine; but it will be understood that any driving mechanism may be employed for transmitting power to the differential gearing, as this feature is of minor importance in accomplishing the objects of my invention.

The bevel gear-wheels 16 are each provided with a circumferential flange 19, preferably cast integral therewith. The flange 19 is arranged on the side of the wheel opposite to that having the bevel-gear teeth, and relatively to each other the flanges extend laterally in opposite directions. These flanges serve as brake-drums, which are internally turned true to form the braking-surfaces.

Disposed within each brake-drum is an expanding brake-band 20, of suitable spring metal. These bands are substantially complete circles and are adapted to engage the brake-drums throughout their circumferences. As shown in Fig. 3, each brake-band 20 is provided with a strap or yoke-piece 21, riveted thereto. Supporting studs or lugs 22, one bolted in each side plate of the differential-gear yoke, afford means for supporting the brake-bands relatively stationary or in constant operative relation to the brake-drums.

A brake-band is supported on each of the studs or lugs 22 by means of its strap 21 and is retained thereon by an annular flange or head 23 on the inner ends of each stud. These flanges 23 on the supporting-studs also prevent rubbing contact of the brake-bands with the web portions of the bevel gear-wheels 16, so as to obviate unnecessary wear and friction.

Two expanders 24 are provided for actuating the brake-bands, one expander being arranged between the meeting ends of each brake-band. These expanders are journaled to freely turn in the side plates 11 of the yoke. Their outer ends each carry an arm 25, Fig. 2, disposed exterior of the differential-gear box or casing, and their inner ends are S-shaped in cross-section, Fig. 3, so as to form suitable toes or abutments 26 for engaging the ends of the brake-bands. One end of each of the brake-bands is offset within its periphery, so that the ends of the brake-band engage the toes or abutments 26 in such a disposition as to produce a maximum braking effect with but slight movement of the expanders. In other words, the ends of the band overlap, and the actuator or expander is located between them. The S-shaped ends of the expanders are provided with flanges 27, which serve the same function as the flanges 23 of the supporting-studs, thus combining therewith for maintaining the proper relation of the brake-bands to the bevel gear-wheels and brake-drums. The flanges 27 also have the function of retaining the expanders in their bearings, as the ends of the brake-bands interlock with the flanges, and thereby prevent accidental disengagement of the expanders. Furthermore, the proper relation of the brake-band and expanders is always maintained by the flanges on the supporting-lugs and expanders whether the differential yoke and parts of the rear-axle structure are assembled or taken apart. In other words, each brake-band is supported so as to be removable with its adjacent side plate of the yoke when the latter is detached from the top and bottom plates without the necessity of altering its adjustment. This feature is advantageous, as it facilitates disassembling or assembling of the parts for the purpose of inspection or repair.

In order to produce a uniform braking effect upon the vehicle with the present form of brake, the brake-bands must be applied to the brake-drums simultaneously, thereby checking equally and at the same time the power imparted to the two bevel gear-wheels. For accomplishing this purpose the expanders are connected with an equalizing-shaft 28, that is adapted to be operated by a suitable foot or hand lever mechanism. This shaft 28 is pivotally supported adjacent its center by a knuckle-joint 29, Fig. 5, and is provided with a pair of arms 30, each of which is disposed, preferably, at equal distances from the pivotal connection and in the plane of an adjacent arm 25 of the expanders. The knuckle-joint comprises a depending lug 31 on the shaft 28 and two lugs 32 on a supporting member or strap 33, which is secured at one end to the engine-frame 34 and at its other end to the differential-gear yoke, the lugs being provided with registering openings for receiving a pintle 35. Fig. 5 shows in detail this knuckle-joint, it being one that permits of a limited tilting movement of the shaft. The tilting of the shaft 28, in addition to its swinging movement, is particularly desirable, for it affords compensation for unequal wear of the brake-bands, so that the power applied will be equalized between them rather than be sustained by the lugs of the joint were there no provision for the tilting of the shaft. Thus the lugs are preferably separated slightly from one another, and the opening in the lug 31 is of larger diameter than the pintle 35 for receiving a ball 36, upon which the shaft swings or tilts.

The arms 30 of the shaft terminate in spherical sockets 37, and the arms 25 of the expanders are also provided at their ends with sockets 38. The sockets of adjacent arms of the shaft and expanders, as clearly shown in Fig. 6, receive the ball ends of a link 39. The ends of the links 39 are secured in the sockets by pins 40. One end of the equalizing-shaft 28 is formed into a crank-arm 41, which is hinged to a drag-link 42, the same in turn being connected with a lever 43 intermediate a foot lever or pedal 44 and its connecting-link 45. Any suitable foot or hand lever mechanism may be employed for operating the shaft 28 without affecting the scope of my invention. The pins 40 are inserted through the openings 46 in the sockets and are secured in bores 47 of the ball ends of links by frictional engagement. The ends of the pins are reduced abruptly in diameter to form shoulders. These reduced ends extend into the openings 46 and allow a limited movement of the links in the sockets, while the shoulders are adapted to interlock with the edges of the openings, so that the possibility of the pins working loose is eliminated. Each end of the links is provided with an oil-duct 48, in which a piece of oil-saturated felt is compressed. The expansive force of the felt tends to take up any loose play between the socket-and-ball end, and thereby contributes to form a cushioned and noiseless joint.

From the foregoing description the operation of the vehicle-brake will be understood to be as follows: Power upon being applied to the pedal is transmitted by the intervening mechanism to the crank-arm of the shaft 28, actuating the same and causing the arms 30 thereon to swing forward. These in turn depress the arms 25 of the expanders by the links 39, and as the arms 25 are depressed the expanders are actuated, causing the toes or abutments thereof to engage with the ends of the brake-bands, thus expanding them and forcing a frictional engagement with the brake-drums. By reason of the arms 30 being rigid with the shaft 28 they act in unison and with equal power, so that the braking effect is the same on each bevel gear-wheel of the differential gear.

In this construction of vehicle-brake the braking parts are all disposed within a dust-proof casing, and as the brake-bands are unfaced, being simply of metal, the differential-gear box may contain lubricating-oil without materially impairing the effectiveness of my brake.

In accordance with the provisions of the patent statutes I have described the principle of operation of my invention, together with the apparatus which I consider to be the best embodiment thereof; but I desire to have it understood that the apparatus is only illustrative and that the invention can be carried out by other means.

What I claim as new, and desire to secure by Letters Patent of the United States, is—

1. In a vehicle-brake, the combination of a divided driving-axle and differential gearing, a yoke for the gearing, comprising side plates separably connected by top and bottom plates, brake-drums provided on each member of a divided axle, brake-bands for the drums each mounted on a side plate of the yoke and removable therewith, and means for operating the brake-bands.

2. In a vehicle-brake, the combination of a divided driving-axle and a differential gearing, stationary sleeves for the axle which form part of the running-gear, a yoke for the gearing comprising separably-connected parts united with the sleeves, a drum on each bevel gear-wheel of the differential gearing, brake-bands carried by the separable parts of the yoke, and means also carried by said parts for operating the brake-bands.

3. In a vehicle-brake, the combination of the bevel gear-wheels of the differential gearing, brake-drums on said wheels, a stationary yoke for the gearing comprising removable parts, brake-bands, means for supporting the brake-bands on the separable parts of the yoke in coöperative relation to the drums, and actuators for the brake-bands mounted in the separable parts of the yoke and removable therewith.

4. In a vehicle-brake, the combination of a differential gearing, a stationary yoke therefor comprising separable parts, brake-drums provided on the differentially-movable members of the gearing, brake-bands therefor removably mounted on the separable parts of the yoke and removable therewith, and actuators for the brake-bands interlocking with the ends thereof for maintaining their coöperative relation.

5. In a vehicle-brake, the combination of a differential gearing, a yoke therfore comprising separable parts, brake-drums provided on the differentially-movable members of the gearing, brake-bands therefor, supporting-lugs removably securing the bands to the separable parts of the yoke, and actuators for the brake-bands mounted on the separable parts of the yoke and interlocking with the ends of the brake-band whereby the latter retain their coöperative relation to the actuator upon removal of the separable parts of the yoke.

6. The combination of a plurality of brake-drums, expanding brake-bands therefor, S-shaped expanders forming abutting engagement with the ends of the brake-bands, arms on the expanders, a shaft, arms thereon opposite the arms of the expanders, links connecting corresponding arms of the shaft and expanders, and means for actuating the shaft.

7. The combination of brake-drums, expanding brake-bands therefor, S-shaped expanders in abutting relation to the ends of the brake-bands, flanges on the expanders coöperating with the ends of the brake-bands for retaining the expanders in operative relation to the brake-bands, and means for actuating the expanders.

8. The combination of a plurality of brake-drums, brake-bands therefor, independent actuating means for the brake-bands, a shaft forming a common connection for the actuating means, a central pivotal mounting for the shaft having a limited lost motion for equalizing the force exerted by the shaft between the independent actuating means, and means for operating the shaft.

9. The combination of a plurality of brake-drums, brake-bands therefor, independent means for actuating the brake-bands, a shaft connected with the means for actuating the same simultaneously, and a knuckle-joint supporting the shaft, comprising a depending lug on the shaft having a bearing therein, a ball in the bearing, a pin in the ball forming trunnions therefor, and means supporting the pin.

10. The combination of brake-drums, brake-bands, actuators, arms on the latter, an equalizing-shaft, arms formed thereon, sockets provided at the ends of said arms and having diametrically opposite openings, ball-ended links engaging in the sockets of adjacent arms of the expanders and shaft, and removable pins tightly fitting in the ball ends of the links, said pins having their ends shouldered and reduced to loosely engage in the openings of the sockets and interlock with the edges of said openings.

11. In a vehicle, the combination of a running-gear frame, a rear driven axle, a differential gearing therefor, a yoke comprising separable parts and fixed to the running-gear frame, and a brake device for each differentially-movable part of the rear axle, one member of each brake being carried by the rear axle and the other member thereof being carried by and removable with the separable parts of the yoke.

In witness whereof I have hereunto set my hand this 7th day of August, 1903.

AUGUSTUS A. BALL, Jr.

Witnesses:
DUGALD McK. McKILLOP,
CHATTIN BRADWAY.